US00RE43110E

(19) United States
(12) Reissued Patent
Oki et al.

(10) Patent Number: US RE43,110 E
(45) Date of Reissued Patent: Jan. 17, 2012

(54) PIPELINED MAXIMAL-SIZED MATCHING CELL DISPATCH SCHEDULING

(75) Inventors: Eiji Oki, Tokyo (JP); Roberto Rojas-Cessa, Brooklyn, NY (US); Hung-Hsiang Jonathan Chao, Holmdel, NJ (US)

(73) Assignee: Polytechnic University, Brooklyn, NY (US)

(21) Appl. No.: 12/072,900

(22) Filed: Feb. 28, 2008

Related U.S. Patent Documents

Reissue of:
(64) Patent No.: 7,006,514
Issued: Feb. 28, 2006
Appl. No.: 09/873,110
Filed: Jun. 1, 2001

U.S. Applications:
(60) Provisional application No. 60/294,877, filed on May 31, 2001.

(51) Int. Cl.
*H04L 12/28* (2006.01)
(52) U.S. Cl. ..... 370/415; 370/395.4; 370/429
(58) Field of Classification Search ..... 370/395.4, 370/415, 416, 429
See application file for complete search history.

(56) References Cited

U.S. PATENT DOCUMENTS

| | | | | |
|---|---|---|---|---|
| 5,495,476 | A | 2/1996 | Kumar | |
| 6,061,330 | A | 5/2000 | Johansson | 370/229 |
| 6,072,772 | A | 6/2000 | Charny et al. | 370/229 |
| 6,141,323 | A | 10/2000 | Rusu et al. | 370/236 |
| 6,157,643 | A | 12/2000 | Ma | |
| 6,295,295 | B1 | 9/2001 | Wicklund | 370/392 |
| 6,324,165 | B1 | 11/2001 | Fan et al. | 370/232 |
| 6,657,959 | B1 | 12/2003 | Chong et al. | 370/230.1 |
| 6,687,225 | B1 | 2/2004 | Kawarai et al. | 370/230.1 |
| 6,725,267 | B1 | 4/2004 | Hoang | 709/226 |
| 6,795,442 | B1 | 9/2004 | Clayton et al. | 370/395.41 |
| 6,810,031 | B1 | 10/2004 | Hegde et al. | |
| 2001/0023469 | A1 | 9/2001 | Jeong et al. | 710/241 |
| 2002/0061020 | A1* | 5/2002 | Chao et al. | 370/390 |
| 2002/0110134 | A1 | 8/2002 | Gracon et al. | 370/412 |
| 2002/0110135 | A1* | 8/2002 | Oki et al. | 370/412 |
| 2002/0122428 | A1 | 9/2002 | Fan et al. | 370/395.4 |
| 2002/0136230 | A1 | 9/2002 | Dell et al. | 370/416 |
| 2002/0176431 | A1 | 11/2002 | Golla et al. | 370/412 |
| 2003/0007498 | A1 | 1/2003 | Angle et al. | 370/414 |
| 2003/0031193 | A1 | 2/2003 | Andrews et al. | 370/412 |

(Continued)

OTHER PUBLICATIONS

Turner et al., "Architectural Choices in Large Scale ATM Switches," *IEICE Trans. Commun.*, 1998, vol. E81-B, No. 2, 120-137.

(Continued)

*Primary Examiner* — Dang Ton
*Assistant Examiner* — Ryan Kavleski
(74) *Attorney, Agent, or Firm* — Woodcock Washburn LLP

(57) ABSTRACT

A Pipelined-based Maximal-sized Matching (PMM) scheduling approach for input-buffered switches relaxes the timing constraint for arbitration with a maximal matching scheme. In the PMM approach, arbitration may operate in a pipelined manner. Each subscheduler is allowed to take more than one time slot for its matching. Every time slot, one of them provides the matching result. The subscheduler can adopt a pre-existing efficient maximal matching algorithm such as iSLIP and DRRM. PMM maximizes the efficiency of the adopted arbitration scheme by allowing sufficient time for a number of iterations. PMM preserves 100% throughput under uniform traffic and fairness for best-effort traffic.

60 Claims, 10 Drawing Sheets

U.S. PATENT DOCUMENTS

2004/0120321 A1 6/2004 Han et al. ..... 370/395.4

OTHER PUBLICATIONS

Chao et al., "Centralized Contention Resolution Schemes for a Large-Capacity Optical ATM Switch," *Proc. IEEE Atm Workshop '97,* 1998, 11-16.

Smiljanic et al., "RRGS-Round-Robin Greedy Scheduling for Electronic/Optical Terabit Switches," *Global Telecommunications Conference—Globecom '99,* 1999, 1244-1250.

Nong et al., "Analysis of Nonblocking ATM Switches with Multiple Input Queues," *IEEE/ACM Transactions on Networking,* 1999, vol. 7, No. 1, 60-74.

McKeown, N., "The iSLIP Scheduling Algorithm for Input-Queued Switches," *IEEE/ACM Transactions on Networking,* 1999, vol. 7, No. 2, 188-201.

McKeown et al., "Achieving 100% Throughout in an Input-Queued Switch," *IEEE Trans. On Communications,* vol. 47, No. 8, 1260-1267.

Oki et al., "A 10-Gb/s (1.25 Gb/s×8) 4×2 0.25-μm CMOS/SIMOX ATM Switch based on Scalable Distributed Arbitration," *IEEE J. Of Solid-State Circuits,* 1999, vol. 34, No. 12, 1921-1934.

Yamanaka et al., "OPTIMA: Scalable, Multi-State, 640-Gbit/s ATM Switching System Based on Advanced Electronic and Optical WDM Technologies," *IEICE Trans. Commun.,* 2000, vol. E83-B, No. 7, 1488-1496.

Chao et al., "Saturn: A Terabit Packet Switch Using Dual Round-Robin," *IEEE Communications Magazine,* 2000, 78-84.

Nong et al., "On the Provision of Quality-of-Service Guarentees for Input Queued Switches," *IEEE Commun. Mag.,* 2000, 62-69.

Smiljanic, A., "Flexible Bandwidth Allocation in Terabit Packet Switches," 223-239.

J. Turner and N. Yamanaka, "Architectural Choices in Large Scale ATM Switches", *IEICE Trans. Commun.,* vol. E81-B, No. 2, pp. 120-137 (Feb. 1998).

H.J. Chao and J-S Park, "Centralized Contention Resolution Schemes for a Large-Capacity Optical ATM Switch", *Proc. IEEE ATM Workshop '97,* pp. 11-16 (Fairfax, VA, May 1998).

A. Smiljanić, R. Fan and G. Ramamurthy, "RRGS-Round-Robin Greedy Scheduling for Electronic/Optical Terabit Switches", *Global Telecommunications Conference—Globecom '99,* pp. 1244-1250 (May 1999).

G. Nong, J. K. Muppals and M. Hamdi, "Analysis of Nonblocking ATM Switches with Multiple Input Queues", *IEEE/ACM Transactions on Networking,* vol. 7, No. 1, pp. 60-74 (Feb. 1999).

N. McKeown, "The iSLIP Scheduling Algorithm for Input-Queued Switches", *IEEE/ACM Transactions on Networking,* vol. 7, No. 2, pp. 188-201 (Apr. 1999).

N. McKeown, A. Mekkittikul, V. Anantharam, and J. Walrand, "Achieving 100% Throughput in an Input-Queued Switch", *IEEE Trans. on Communications,* vol. 47, No. 8, pp. 1260-1267 (Aug. 1999).

E. Oki, N. Yamanaka, Y. Ohtomo, K. Okazaki and R. Kawano, "A 10-Gb/s (1.25 Gb/s×8) 4×2 0.25-μm CMOS/SIMOX ATM Switch Based on Scalable Distributed Arbitration", *IEEE J. of Solid-State Circuits,* vol. 34, No. 12, pp. 1921-1934 (Dec. 1999).

N. Yamanaka, E. Oki, S. Yasukawa, R. Kawano and K. Okazaki, "OPTIMA: Scalable, Multi-Stage, 640-Gbit/s ATM Switching System Based on Advanced Electronic and Optical WDM Technologies", *IEICE Trans. Commun.,* vol. E83-B, No. 7, pp. 1488-1496 (Jul. 2000).

J. Chao, "Saturn: A Terabit Packet Switch Using Dual Round-Robin", *IEEE Communications Magazine,* pp. 78-84 (Dec. 2000).

G. Nong and M. Hamdi, "On the Provision of Quality-of-Service Guarantees for Input Queued Switches", *IEEE Commun. Mag.,* pp. 62-69 (Dec. 2000).

A. Smiljanic, "Flexible Bandwidth Allocation in Terabit Packet Switches", pp. 233-239.

* cited by examiner

100

200

600

PIPELINED MAXIMAL-SIZED MATCHING CELL DISPATCH SCHEDULING

Matter enclosed in heavy brackets [ ] appears in the original patent but forms no part of this reissue specification; matter printed in italics indicates the additions made by reissue.

§ 0. PRIORITY CLAIM

[Benefit] *This application is a reissue of U.S. Pat. No. 7,006,514, where benefit* is claimed, under 35 U.S.C. § 119 (e)(1), to the filing date of: provisional patent application Ser. No. 60/294,877, entitled "PMM: A PIPELINED MAXIMAL-SIZED MATCHING SCHEDULING APPROACH FOR INPUT BUFFERED SWITCHES", filed on May 31, 2001 and listing Eiji Oki, Roberto Rojas-Cessa and Jonathan Chao as the inventors, for any inventions disclosed in the manner provided by 35 U.S.C. § 112, ¶ 1. This provisional application is expressly incorporated herein by reference.

§ 1. BACKGROUND

§ 1.1 Field of the Invention

The present invention concerns the communication of data over networks, such as the Internet for example. More specifically, the present invention concerns scheduling the servicing (e.g., dispatching) of cells or packets buffered at input ports of a switch.

§ 1.2 Related Art

Switches and routers are used in networks, such as the Internet for example, to forward data towards its destination. The need for high-speed switches and routers is introduced in § 1.2.1 below. Then, input buffering, as used in high-speed switches, is introduced in § 1.2.2 below.

§ 1.2.1 The Need for Large-Scale and High-Speed (e.g., Terabit) Routers and Switches Many expect that Internet traffic will continue to grow explosively. Given this assumption, it is expected that high-speed switches and routers (e.g., those having a throughput over one Terabit per second) will become necessary. Most high-speed packet switches adopt a fixed-size cell in the switch fabric. If variable length packets are to be supported in the network, such packets may be segmented and/or padded into fixed-sized cells upon arrival, switched through the fabric of the switch, and reassembled into packets before departure. Input buffering is introduced below in § 1.2.2 as a way to handle these incoming cells.

§ 1.2.2 Buffering in High-Speed Routers and Switches

There are various types of buffering strategies in switch architectures: input buffering, output buffering, or crosspoint buffering. Information on these strategies can be found in the following articles: G. Nong and M. Hamdi, "On the Provision of Quality-of-Service Guarantees for Input Queued Switches," IEEE Commun. Mag., Vol. 38, No. 12, pp. 62-69 (Dec. 2000); E. Oki, N. Yamanaka, Y. Ohtomo, K. Okazaki, and R. Kawano, "A 10-Gb/s (1.25 Gb/s×8) 4×2 0.25-micrometer CMOS/SIMOX ATM Switch Based on Scalable Distribution Arbitration," IEEE J. Solid-State Circuits, Vol. 34, No. 12, pp. 1921-1934 (Dec. 1999); and J. Turner and N. Yamanaka, "Architectural Choices in Large Scale ATM Switches," IEICE Trans. Commun., Vol. E81-B, No. 2, pp. 120-137 (Feb. 1998). Each of these articles is incorporated herein by reference. Input buffering is a cost effective approach for high-speed switches. This is because input-buffered switches do not require internal speedup, nor do they allocate buffers at each crosspoint. They also relax memory-bandwidth and memory-size constraints.

§ 1.2.2.1 The Use of Virtual Output Queues to Avoid Head-of-Line Blocking

It is well known that head-of-line ("HOL") blocking limits the maximum throughput (e.g., to 58.6%) in an input-buffered switch with a First-In-First-Out (FIFO) structure. See, e.g., the article, M. J. Karol, M. G. Hluchyj, and S. P. Morgan, "Input Versus Output Queuing on a Space-Division Packet Switch," IEEE Trans. Commun., Vol. COM-35, pp. 1347-1356 (1987). This article is incorporated herein by reference. The article, N. Mckeown, "The iSLIP Scheduling Algorithm for Input-Queued Switches," IEEE/ACM Trans. Networking, Vol. 7, No. 2, pp. 188-200 (April 1999), shows using a Virtual-Output-Queue (VOQ) structure to overcome HOL-blocking. This article is incorporated herein by reference.

In an input-buffered switch that uses VOQs, a fixed-size cell is sent from any input to any output, provided that, in a given time slot, no more than one cell is sent from the same input, and no more than one cell is received by the same output. Each input port has N VOQs, one for each of N output ports. The HOL cell in each VOQ can be selected for transmission across the switch in each time slot. Therefore, every time slot, a scheduler has to determine one set of matching. That is, for each of the output ports, the scheduler may match one of the corresponding VOQs with the output port.

§ 1.2.2.2 Maximum-Sized and Maximal-Sized Matching Algorithms in High Speed Switches Maximum-sized matching algorithms to schedule the input-output matching for input-buffered switches with VOQs, that achieve 100% throughput have been proposed. See, e.g., the articles: J. E. Hoperoft and R. M. Karp, "An Algorithm for Maximum Matching in Bipartite Graphs," Soc. Ind. Appl. Math J. Computation, Vol. 2, pp. 225-231 (1973); and N. Mckeon, A. Mekkittikul, V. Anantharam, and J. Walrand, "Achieving 100% Throughput in Input-Queued Switches," IEEE Trans. Commun., Vol. 47, No. 8, pp. 1260-1267 (August 1999). These articles are incorporated herein by reference. Unfortunately, these algorithms are hard to implement in high-speed switches because of their high computing time complexity.

Maximal-sized matching algorithms have been proposed as an alternative to the maximum-sized matching ones. Two of these algorithms, iSLIP and Dual Round-Robin Matching (DRRM), are described in the articles: N. Mckeown, "The iSLIP Scheduling Algorithm for Input-Queued Switches," IEEE/ACM Trans. Networking, Vol. 7, No. 2, pp. 188-200 (April 1999); H. J. Chao and J. S. Park, "Centralized Contention Resolution Schemes for a Large-Capacity Optical ATM Switch," Proc. IEEE ATM Workshop '97, Fairfax, Va. (May 1998); and H. J. Chao, "Saturn: A Terabit Packet Switch Using Dual Round-Robin," IEEE Commun. Mag., Vol. 38, No. 12, pp. 78-84 (December 2000). These articles are incorporated herein by reference. The computing complexity of the iSLIP and DRRM methods are less than maximum matching methods. Moreover, the iSLIP and DRRM methods provide 100% throughput under uniform traffic and complete fairness for best-effort traffic. However, in each of these methods, the maximal matching is to be completed within one cell time slot. Such a constraint may become unacceptable as the switch size increases and/or the port speed becomes high, because the arbitration time becomes longer than one time slot or the time slot shrinks, respectively. For example, for a 64-byte fixed-length cell at a port speed of 40 Gbit/s (OC-768), the computation time for completing maximal-sized matching is only 12.8 ns. Existing proposals for relaxing the time constraints are discussed below in § 1.2.2.3.

§ 1.2.2.3 Round-Robin Greedy Scheduling (RRGS)

To relax the scheduling timing constraint, a pipelined-based scheduling algorithm called Round-Robin Greedy Scheduling (RRGS) is proposed in the article: A. Smiljanic, R. Fan, and G. Ramamurthy, "RRGS—Round-Robin Greedy Scheduling for Electronic/Optical Terabit Switches," Proc. IEEE Globecom '99, pp. 1244-1250 (1999). This article is incorporated herein by reference. With RRGS, each input has only to perform one round-robin arbitration within one lime slot to select one VOQ. However, if a given switch has N inputs, then N input round-robin operations (that select its cell to be transmitted at a given time slot T) are allocated into the different previous N time slots $\{T-N, T-N+1, \ldots, T-1\}$ in a simple cyclic manner so that RRGS can avoid output contention.

Unfortunately, RRGS can't provide max-min fair share for a best-effort service. For example, let $\lambda(i,j)$ be the input offered load to VOQ(i,j) and let $\mu(i,j)$ be the acceptable transmission rate from VOQ(i,j). Consider a 3×3 switch in which $\lambda(0,0)=\lambda(1,0)=1.0$ and in which other input offered loads $\lambda(i,j)=0$. According to the RRGS algorithm, the acceptable transmission rate is obtained as $\mu(0,0)=2/3$ and $\mu(1,0)=1/3$. Thus, when traffic is not balanced, some inputs can unfairly send more cells than others. The article, A. Similjanic, "Flexible Bandwidth Allocation in Terabit Packet Switches," Proc. IEEE Workshop on High Performance Switching and Routing 2000, pp. 233-239 (2000) proposes weighted-RRGS ("WRRGS"), which guarantees pre-reserved bandwidth. This article is incorporated herein by reference. However, even with WRRGS, fairness is not guaranteed for best-effort traffic. In addition, once every N time-slot cycles, an idle time slot is produced when N is an even number. This means that RRGS does not maximize its use of the switching capacity.

§ 1.2.3 Unmet Needs

In view of the foregoing limits of proposed maximal matching scheduling schemes, one that (i) relaxes the scheduling time into more than one time slot, (ii) provides high throughput, and/or (iii) maintains fairness for best-effort traffic, is still desired.

§ 2. SUMMARY OF THE INVENTION

The present invention may be used to meet the unmet needs outlined in § 1.2.3 above. The present invention may do so by operating, in a pipelined manner, several subschedulers within a main scheduler. This permits each subscheduler to take more than one time slot to complete its matching. For each time slot, one of the subschedulers provides the matching result. Since the subschedulers collectively generate one match per time slot, the subschedulers may adopt a pre-existing maximal matching algorithm, such as iSLIP or DRRM for example, thereby taking advantage of the desirable properties of these algorithms—namely 100% throughput under uniform traffic and fairness for best-effort traffic—found in their non-pipelined versions.

Assuming that it takes each subscheduler K (or between K−1 and K) time slots to perform the matching, in one embodiment, a main scheduler may have K subschedulers. Assuming that cells arrive at the switch in a uniform fashion, each subscheduler may begin arbitration in successive time slots. Since there are K subschedulers, each one may use K time slots to perform a match. Accordingly, the main scheduler may produce a match every time slot.

§ 3. BRIEF DESCRIPTION OF THE DRAWINGS

Figure 7A:
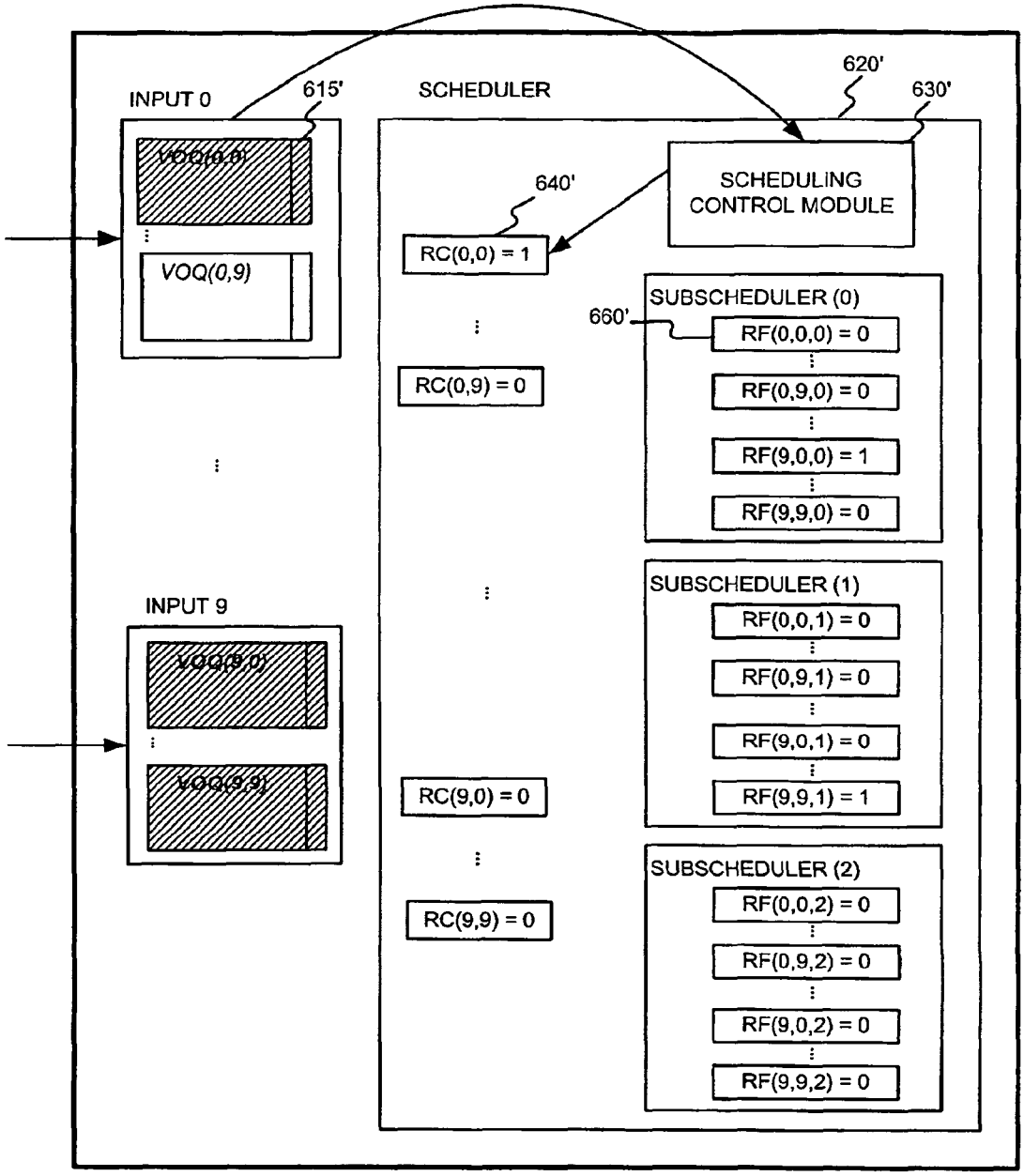
Figure 7B:
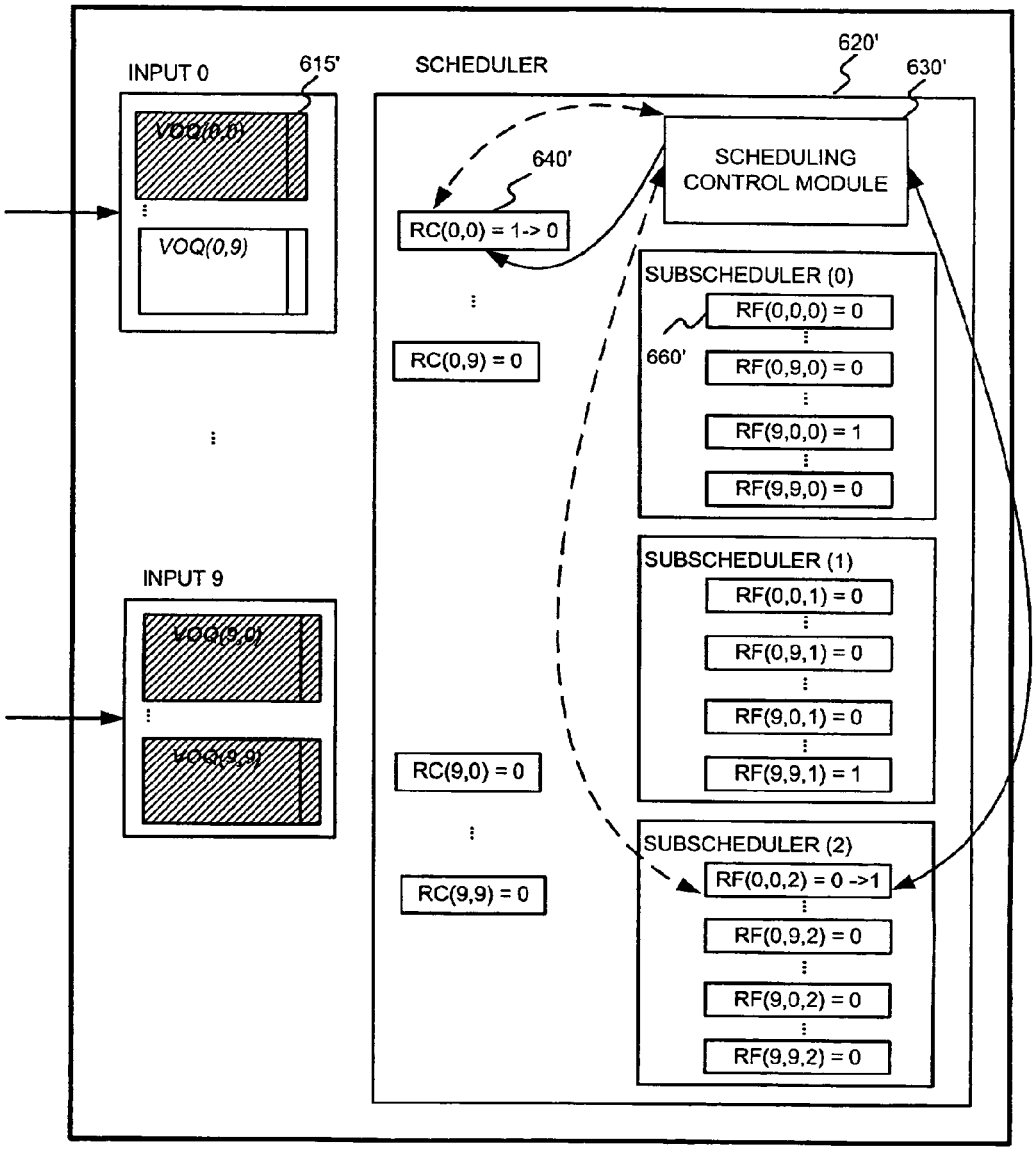
Figure 7C:
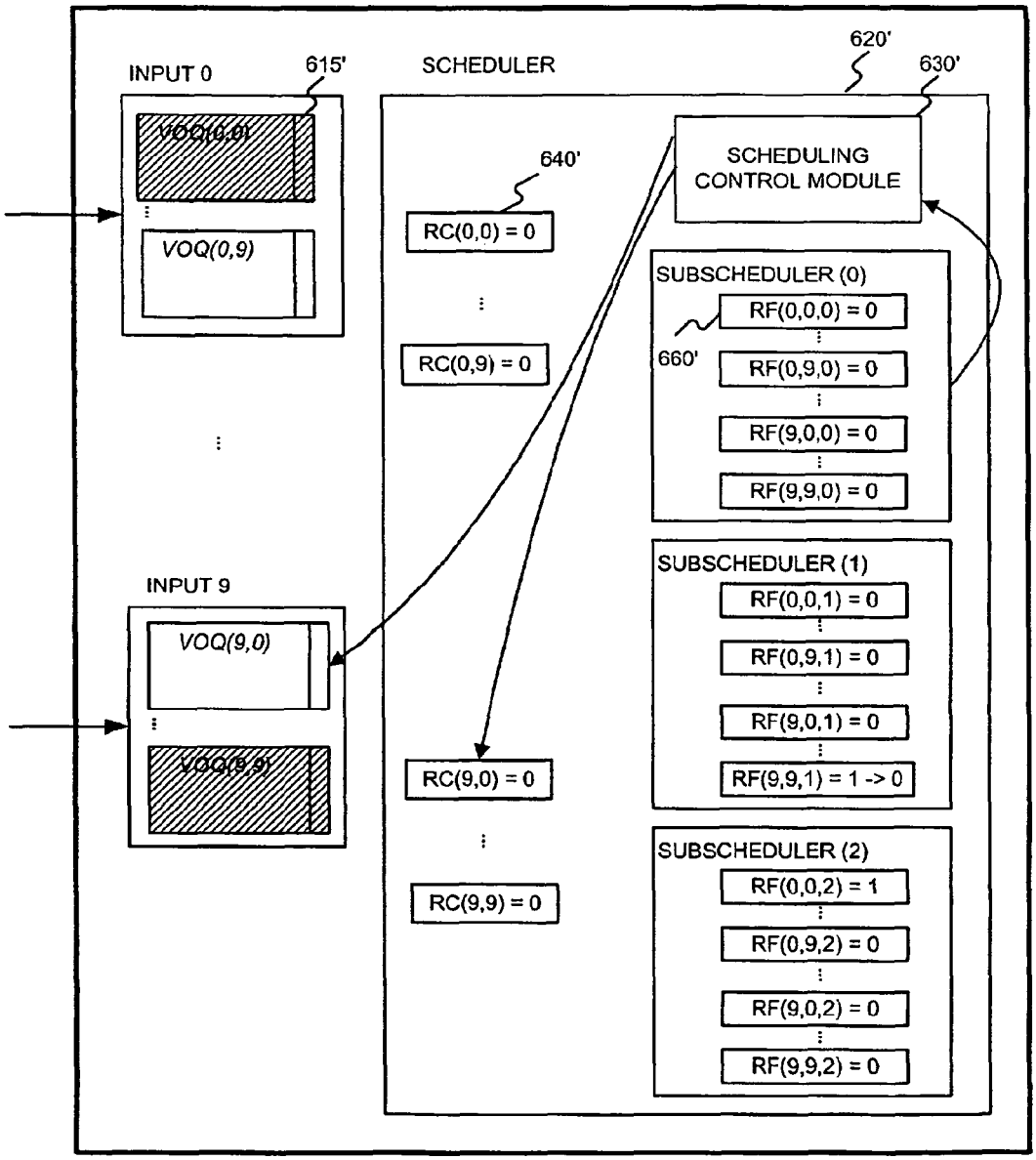

FIGS. 7(a) through 7(c) provide an example that illustrates an operation of an exemplary pipelined maximal-sized matching scheduling approach under the present invention.

FIG. 8 is a timing diagram illustrating the operation of subschedulers in the example of FIGS. 7(a) through 7(c).

§ 4. DETAILED DESCRIPTION OF THE INVENTION

The present invention involves methods, and apparatus for scheduling the dispatch of cells or packets in a high-speed input buffered switch. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

§ 4.1 Exemplary Environment

Figure 1:
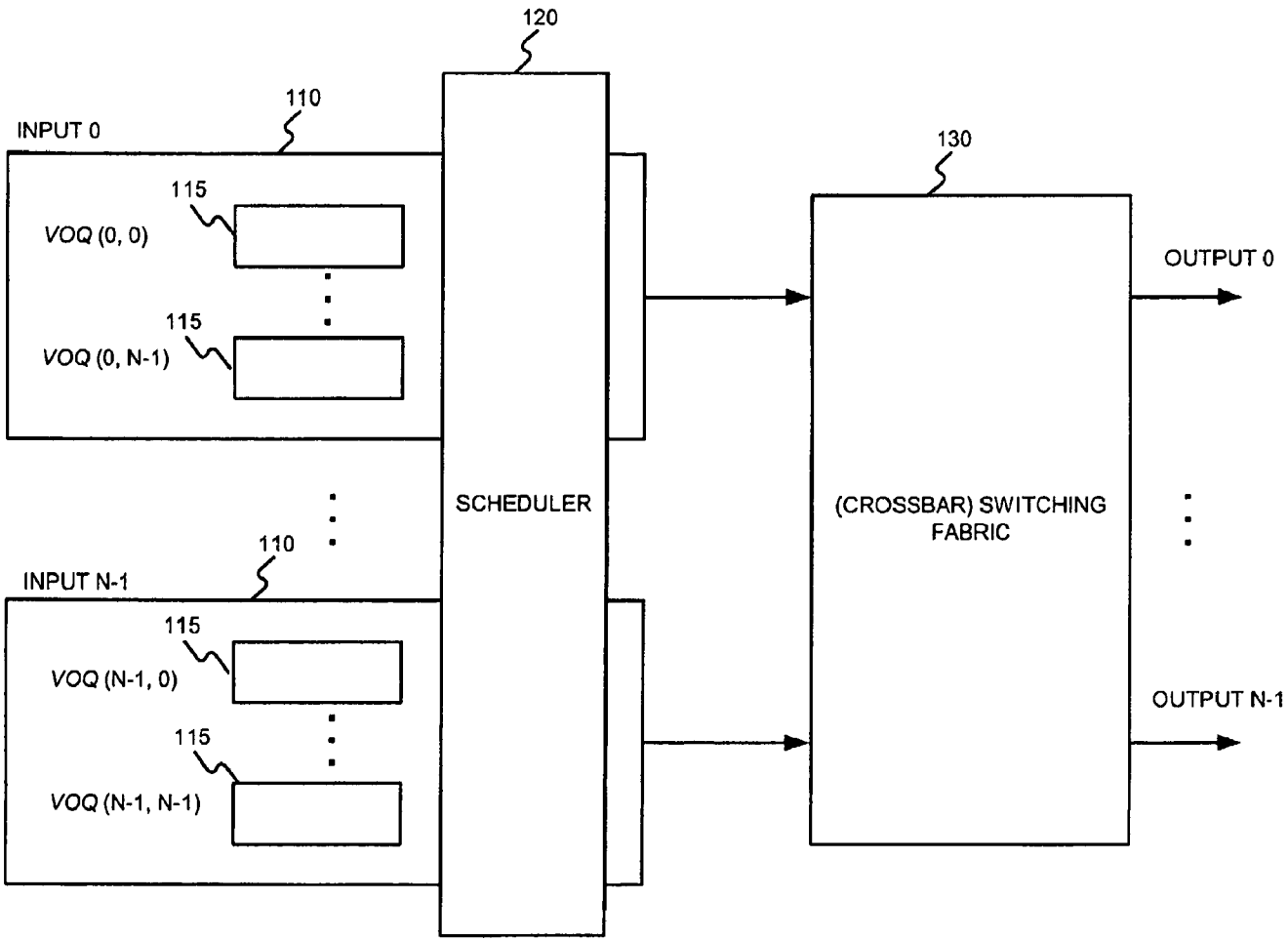
FIG. 1 is a block diagram of an exemplary input buffered switch with which the present invention may be used.

The present invention may be used with an input-buffered switch with virtual output queues (VOQs). For example, as shown in FIG. 1, the switch 100 may include input (ports) 110, a main scheduler 120 and (e.g., crossbar) switching fabric 130. As shown in FIG. 1, there may be N inputs. In one embodiment, these N inputs may be grouped across m input modules (not shown). Each input 110 will preferably have a number of VOQs corresponding to the number of outputs. Thus, if there are N outputs, each input will have N VOQs.

In an exemplary embodiment of the invention, the main scheduler 120 may include $N^2$ request counters, and K subschedulers. Each of the K subschedulers may have $N^2$ request flags. Each of the K subschedulers may operate in a pipeline manner, thus allowing each subscheduler to take K time slots, and still produce a match (using, e.g., DRRM, iSLIP, or another maximal matching technique) in every cell time slot.

In the explanation of an exemplary embodiment of the invention, the following terms will be used:

N=the number of input ports and output ports;

K=the number of subschedulers in each input module;

VOQ(i,j)=the VOQ of input i that stores cells destined for output j, where $0 \leqq i \leqq N-1$, and $0 \leqq j \leqq N-1$;

RC(i,j)=the request counter associated with VOQ(i,j);

$L_{max}$=the maximum VOQ occupancy;

C(i,j)=the value of RC(i,j)—the number of accumulated requests associated with VOQ(i,j) that have not been sent to any subscheduler, where $0 \leqq C(i,j) \leqq L_{max}$;

RF(i,j,k)=the request flag associated with VOQ(i,j) and subscheduler k, where $0 \leqq k \leqq K-1$;

F(i,j,k)=the value of RF(i,j,k), where $0 \leqq F(i,j,k) \leqq 1$;

When F(i,j,k) is set to one, this indicates that input i has a request to output j in subscheduler k. When F(i,j,k) is set to zero, this indicates that input i has no request to output j in subscheduler k.

§ 4.2 Functions that may be Performed

A first aspect of the present invention may function to relax the time needed for scheduling by maximal-sized matching algorithms. (Recall that with prior techniques, the maximal matching has to be completed within one cell time slot.) The present invention may accomplish this by operating several subschedulers in a pipelined manner. In this way each cell may use more than one cell time slot to reach arbitration, so long as the subschedulers, collectively, finish matching for at least one cell every time slot. The present invention may insure that this occurs by providing K subschedulers, where each of the K subschedulers generate a match in no more than K cell time slots.

The present invention may also function to provide high throughput and fairness in best-effort traffic. The present invention may accomplish this by adopting an appropriate maximal matching algorithm, such as iSLIP or DRRM for example. Either algorithm may be implemented because the present invention may provide a match every time slot. These algorithms have been proven to provide 100% throughput under uniform traffic, and maintain fairness for best-effort traffic.

§ 4.3 Exemplary Operations

Figure 2:
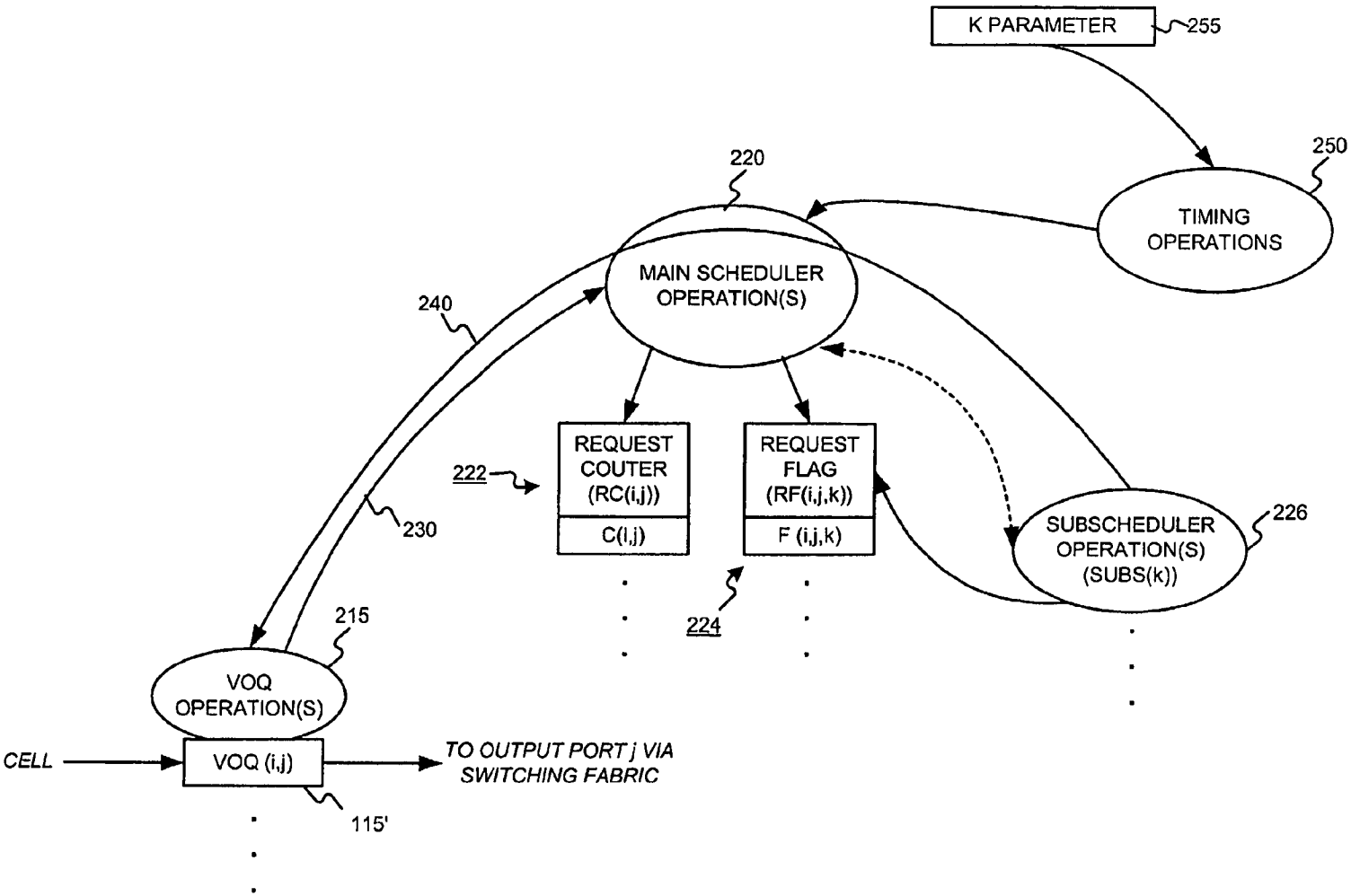
FIG. 2 is a bubble chart illustrating operations that may be performed by the present invention.

FIG. 2 is a bubble chart illustrating operations that may be performed in accordance with the present invention. When a new cell arrives at the switch, the VOQ operation(s) 215 may place the cell in the appropriate VOQ 115'. It 215 may also inform the main scheduler operation(s) 220 about the stored cell. Next, the main scheduler operation(s) 220 may increment the value (C(i,j)) of the request counter (RC(i,j)) corresponding to the VOQ (VOQ(i,j)) storing the cell. That is, C(i,j)=C(i,j)+1.

At the beginning of every cell time slot t, the main scheduler operation(s) 220 may check to see if there are any cells in a VOQ that are waiting dispatch arbitration. If it finds that there is a cell waiting for arbitration, and that the next subscheduler is not already handling a cell in the same VOQ (i.e., if C(i,j)>0 and F(i,j,k)=0, where k=t mod K), it may decrement the value (C) of the associated request counter (RC) 222 and set the associated request flag (RF) 224 (i.e., C(i,j)=C(i,j)−1 and F(i,j,k)=1) If the foregoing conditions are not met (i.e., if C(i,j)=0, or if F(i,j,k=1)) it may leave the value (C) of the request counter (RC) 222 and the value (F) of the request flag (RF) 224 unchanged.

Subscheduler k 228 may perform a maximal-sized matching operation 226. It may do so at a time t, where $Kl+k \leqq t < K(l+1)+k$, where l is an integer. In one embodiment, to apply the DRRM maximal matching algorithm as a matching algorithm in a subscheduler k, F(i,j,k) may be used instead of VOQ requests as occurs in DRRM. Each subscheduler k may have its own round-robin pointers. The position of pointers in a subscheduler k may be modified by the results only from subscheduler k. The operation of DRRM in a subscheduler k may be the same as that of the non-pipelined DRRM scheme.

By the end of every time slot t, the subscheduler k 228 that started the matching operation K time slots previously (i.e., where k=(t−(K−1)) mod K), will have completed the matching operation 226. When an input-output pair (i,j) is matched, the main scheduler operation(s) 220 may unset the $k^{th}$ subscheduler's corresponding flag (i.e., F(i,j,k)=0). In this case, the VOQ operations 215 may be allowed to send the HOL cell in the associated VOQ 115' to output at the next time slot. This may be used to ensure that cells from the same VOQ 115' are transmitted in sequence, even if L(i,j)−C(i,j)>1, where L(i,j) is the occupancy of VOQ(i,j) (Note that $$\left(\text{Note that } L(i,j) - C(i,j) = \sum_{k=0}^{K-1} F(i,j,k)\right).$$

When an input-output pair is not matched, the flag is not changed. Note that in one alternative, the subscheduler operation(s) 226 may reset the flag (F(i,j,k)) directly.

Timing operations 250 may determine a current cell time slot (t), and using parameter K 255, may determine control signals based on its present determined value k.

Having described various operations that may be performed in accordance with the present invention, exemplary apparatus, methods and data structures for implementing such operations arc now described in § 4.4 below.

§ 4.4 Exemplary Methods and Apparatus for Performing the Exemplary Operations

Exemplary methods that may be used to implement various operations of the present invention are described in § 4.4.1. Then, exemplary apparatus that may be used to implement various operations of the present invention are described in § 4.4.2.

§ 4.4.1 Exemplary Methods

Figure 3:
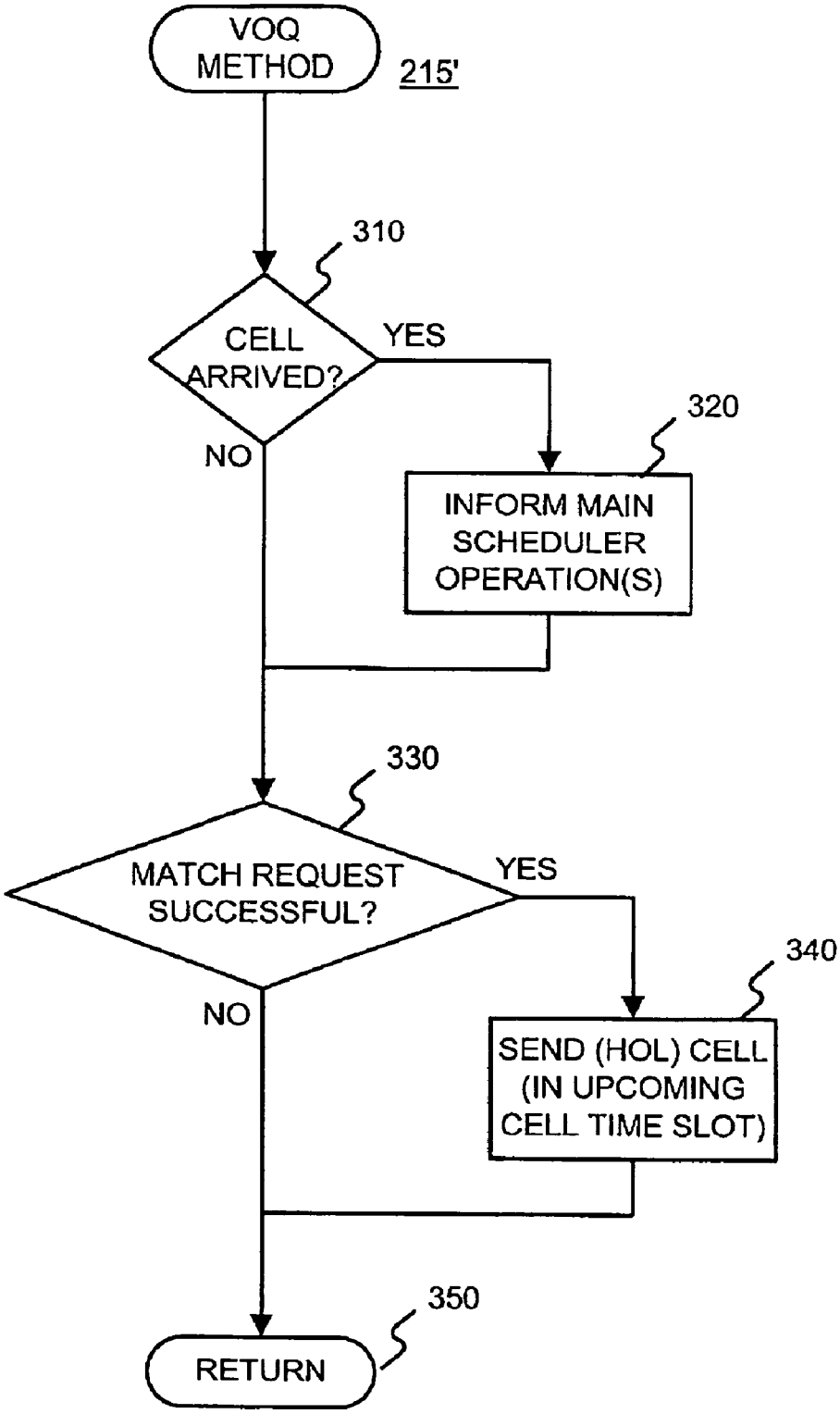
FIG. 3 is a flow diagram illustrating an exemplary virtual output queue method that may be performed under the present invention.

FIG. 3 is a high-level flow diagram of an exemplary method 215' that may be used to effect a virtual output queue operation 215. The order in which the steps are effected is not intended to be limited to the order shown. Referring to conditional branch point 310, when a new cell arrives at the VOQ(i,j) 115', the main scheduler operation(s) 220 may be informed, as indicated by block 320. (See, e.g., communication 230 of FIG. 2.) Referring to conditional branch point 330, if a previous match request has succeeded, the HOL cell in VOQ(i,j) 115 may be sent to output j (e.g., in the next cell time slot). A successful match request indication may be provided directly from the subscheduler (k) (See, e.g., communication 240 of FIG. 2.), or via the main scheduler operation(s) 220.

Figure 4A:
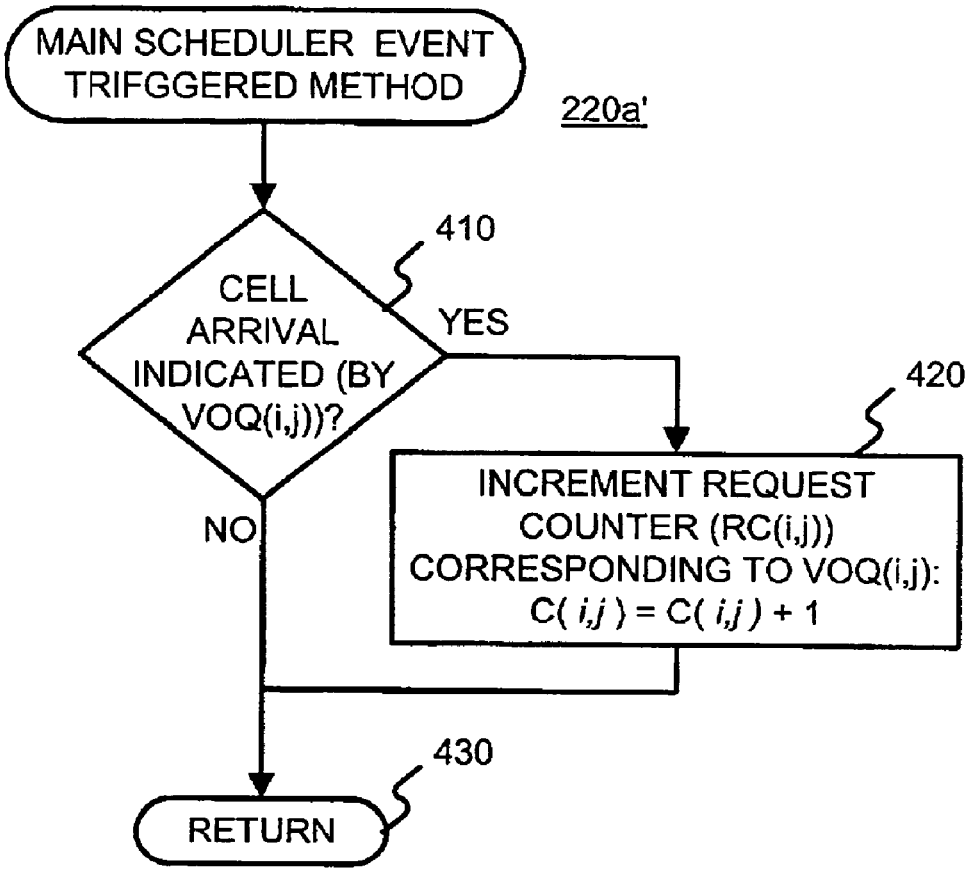
FIGS. 4A and 4B are flow diagrams illustrating exemplary main scheduler methods that may be performed under the present invention.
Figure 4B:
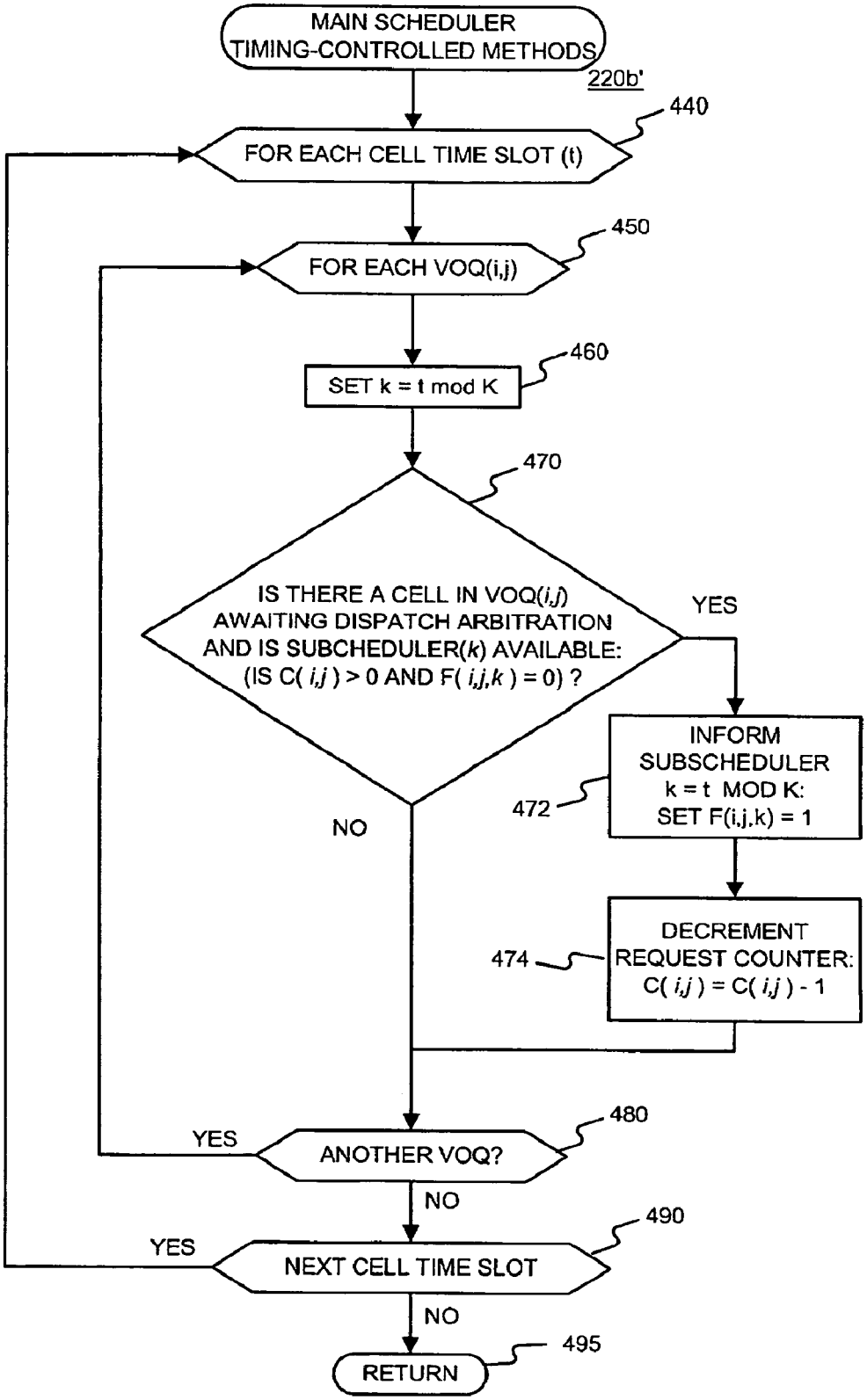

The main scheduler operation(s) 220 serve to manage the request counters 222, the request flags 224, and the subscheduler operations 226. The acts related to these management responsibilities may be triggered by events (e.g., the entry of a new cell into a VOQ) and may be run periodically or in accordance with some timing-based control (e.g., based on a value (k) derived from a current time slot (t)). Indeed, the timing operations 250 of FIG. 2 may be thought of as one of the main scheduler operation(s) 220. FIG. 4A is a flow diagram of an exemplary method 220a' for event-triggered acts of the main scheduler operation(s). FIG. 4B is a flow diagram of an exemplary method 220b' for timing-controlled acts of the main scheduler operation(s). Each is described below.

FIG. 4A is a high-level flow diagram of an exemplary method 220a' for effecting main scheduler event-triggered operations. Referring to the conditional branch point 410 and block 420, when a new cell arrives at a VOQ, this fact is relayed to the main scheduling operation(s) 220 (Recall 310 and 320 of FIG. 3.) and the count value C(i,j) of the counter RC(i,j) corresponding to the VOQ receiving the cell, is incremented.

FIG. 4B is a high-level flow diagram of an exemplary method 220b' for effecting main scheduler timing-controlled operations. The order in which the steps are effected is not intended to be limited to the order shown. As shown by loop 440–490, the main steps of the method 220b' are run for each cell time slot (t) (e.g., at the start of each cell time slot). As shown by loop 450–480, the main steps of the method 220b' may be run for each VOQ. Note that separate instances of the method 220b' could be run in parallel for the various VOQs. As shown in block 460, k is set to t mod K. (Note that k can be thought of as "timing-based".) Referring now to conditional branch point 470, the method 220b' may determine whether C(i,j)>0 and F(i,j,k)=0. That is, the method 220b' may determine if there is a cell in VOQ(i,j) awaiting dispatch arbitration and if subscheduler K is available to VOQ(i,j). If these conditions are met, the $k^{th}$ subscheduler 228 may be informed, e.g., by setting flag F(i,j,k) to "1", as indicated by block 472. Further, the request counter may be decremented (C(i,j)=C(i,j)=1), as indicated by block 474.

Figure 5:
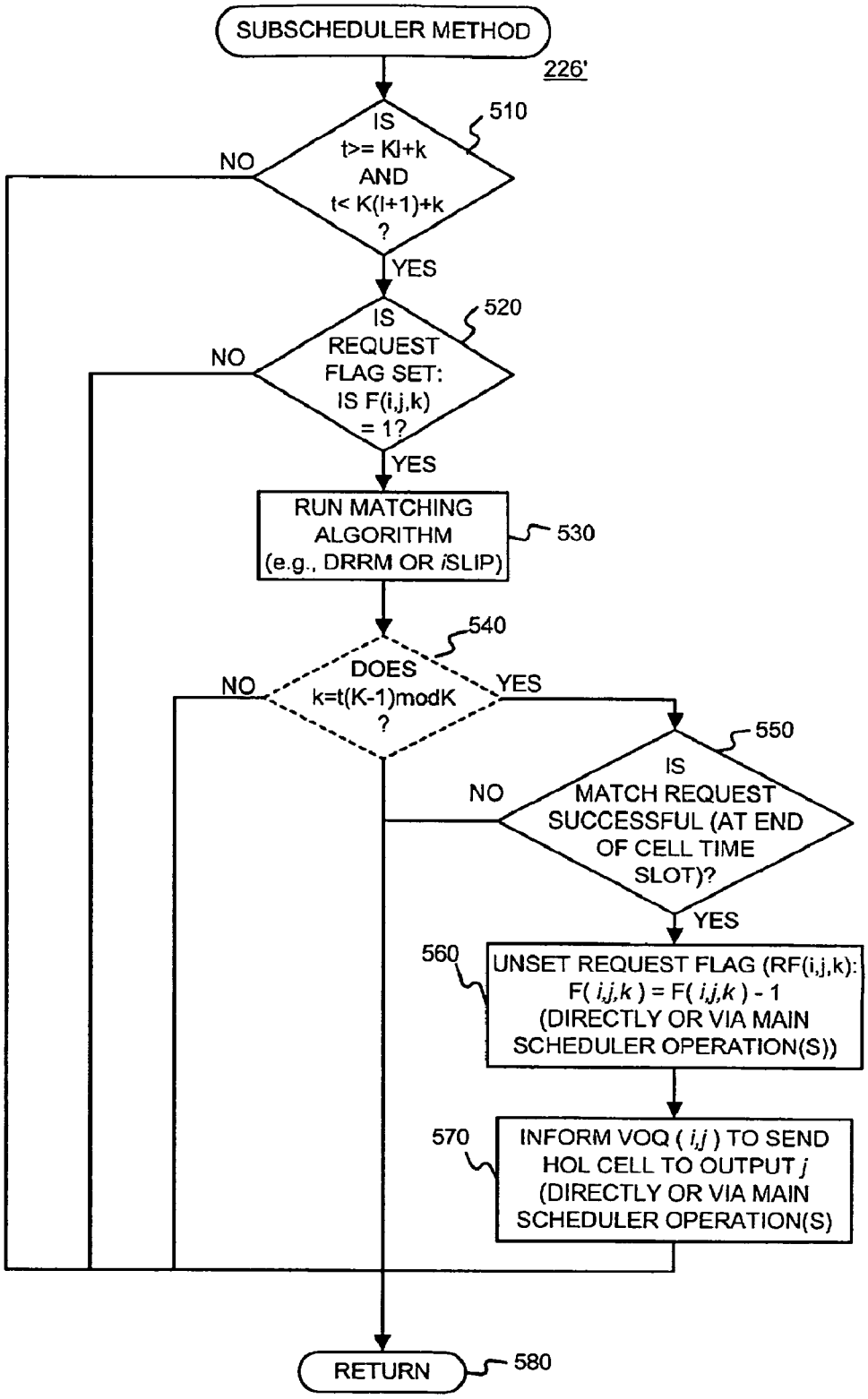
FIG. 5 is a flow diagram illustrating an exemplary matching method that may be performed under the present invention.

FIG. 5 is a high-level flow diagram of an exemplary method 226' that may be used to effect each of the subscheduler operation(s) 226. As indicated by conditional branch points 510 and 520, and block 530, in each case, the particular subscheduler k may run a matching operation when the time slot t≧Kl+k and t<K (l+1)k. (This is illustrated for K=3 in FIG. 8, described in § 4.5 below.) That is, as indicated by conditional branch point 520, it is determined whether or not the request flag (RF) is set to one (F(i,j,k)=1). If so, the subscheduler k may run the matching algorithm for the (HOL) cell of VOQ(i,j) as indicated by block 530. Further, at the end of the time slot, a subscheduler will have finished its matching operations. This will be the case for subscheduler k, where k=(t−(K−1) mod K). Thus, as indicated by conditional branch points 540 and 550, if k=(t−(K−1) mod K), it is determined whether or not the match request was successful (for VOQ(i,j)). If so, the request flag RF(i,j,k) may be unset (F(i,j,k)=zero) as indicated by block 560, and the appropriate VOQ may be informed of this, as indicated by block 560, so that it will send its (HOL) cell to the appropriate output. Note that in this embodiment, each subscheduler k generates a match for each requested output port. An output port is requested if any of the VOQs(_, j) is non-empty.

§ 4.4.2 Exemplary Apparatus

Figure 6:
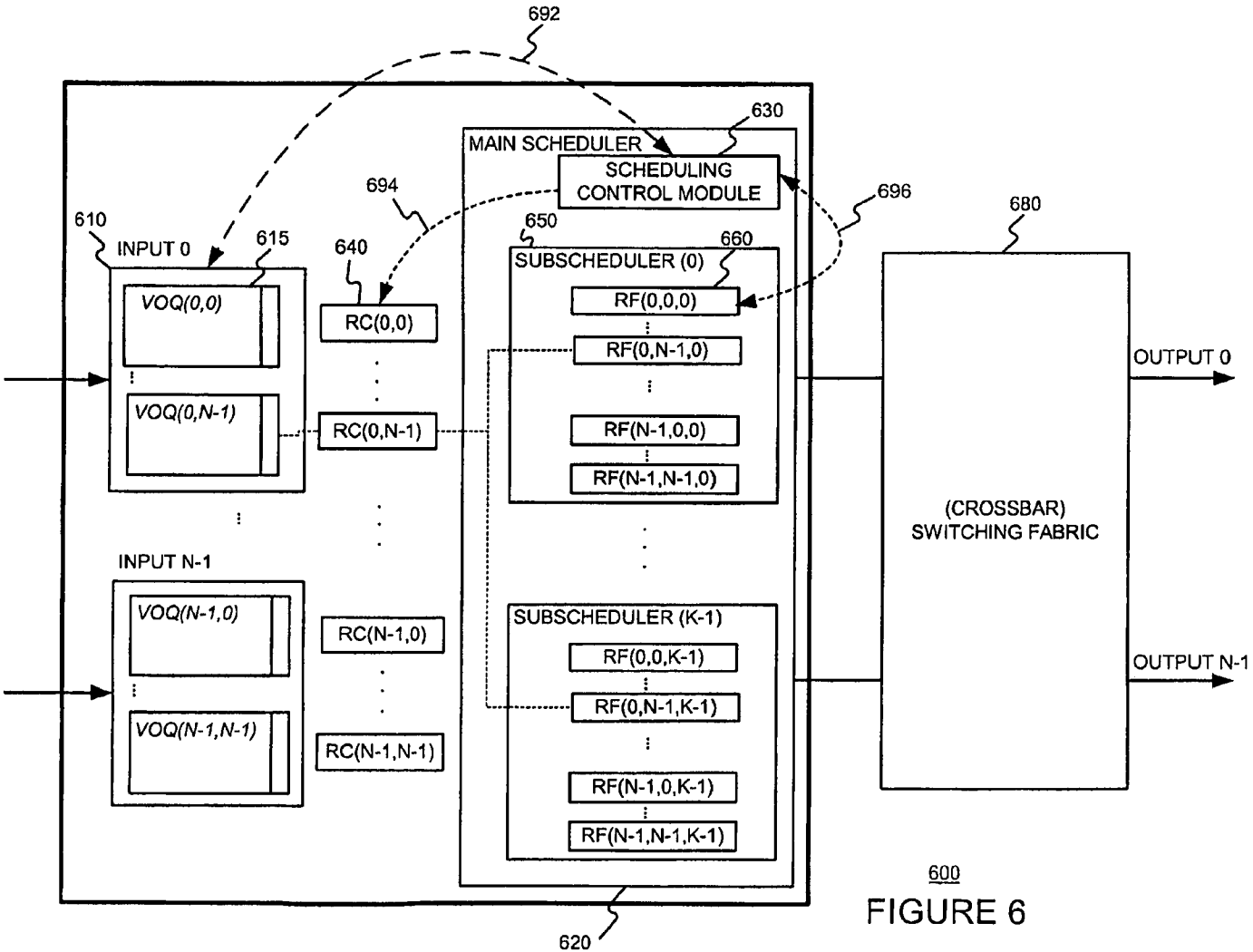
FIG. 6 is a block diagram of an exemplary apparatus, as well as inter-component signaling links, that may be used to perform operations under the present invention.

FIG. 6 is a high-level block diagram illustrating exemplary components and interconnections of an exemplary apparatus 600 that may be used to effect at least some of the operations of the present invention. Each of the inputs 610 includes (or more generally, is associated with a corresponding) a number of virtual output queues (VOQs) 615 corresponding to the number of outputs. An exemplary main scheduling module 620 may include (or more generally, be associated with) K subschedulers 650 and $N^2$ request counters (RCs) 640, each of the request counters (RCs) being associated with a VOQ (and therefore an input-output pair). To simplify the drawing, only the components associated with the VOQs of one of the inputs are shown. Each of the K subschedulers 650 may include (or more generally, be associated with) $N^2$ request flags (RFs) 660, each of the request flags (RFs) 660 in each of the subschedulers being associated with a VOQ (and therefore an input-output pair). The VOQ operations 215 may be effected on the virtual output queues 615. The main scheduler operations 220 and timing operations 250 may be effected on the scheduling control module 630. Finally, the subscheduling operations 226 may be effected on the subschedulers 650. Naturally, such operations only need to be associated with the VOQs of an input, and can be effected in many other ways.

There are various signaling lines and links that may be provided. The solid lines may be used to indicate the receipt of a cell, and the transmission of the cell to the output via the (e.g., crossbar) switching fabric 680. The signaling line(s), depicted by the dashed line 692, may be used to indicate, to the scheduling control module 630, the arrival of new cells, and to indicate to the VOQs when a match request was successful. The signaling lines, depicted by dotted lines 694 and 696, may be used by the scheduling control module 630 to control the request counters 640 and the request flag 660 values, and to permit communications between the scheduling control module 630 and each of its subschedulers 650.

The VOQ operations 215, the main scheduler operations 220, and the subscheduler operations 226 may be effected by programmable logic arrays, integrated circuits such as application specific integrated circuits, and/or microprocessors operating in accordance with (e.g., stored) instructions. Memory (referred to generally as a "machine readable medium") may be used to store the various state information, i.e., the values of the request counters and request flags), used by these components. Similarly, memory can be used to buffer cells at the virtual output queues.

§ 4.5 Examples Illustrating Operations Performed by an Exemplary Embodiment

FIGS. 7(a) through 7(c) illustrate an example of operations of a pipelined maximal-sized matching scheduling method employing subschedulers in accordance with one embodiment of the invention. In this example, the invention is embodied in an input-buffered switch, such as that illustrated in FIG. 1. In the exemplary switch, N=10 and K=3. The request counters (RCs) and the request flags (RFs) are initialized, i.e., C(i,j)=0 and F(i,j,k)=0.

Two previous cells have arrived and are being matched by subscheduler 0 and subscheduler 1. In FIG. 7a, these cells can be seen waiting in VOQ (9,0) and VOQ (9,9), respectively. As indicated, the request flags of RF(9,0,0) and RF(9,9,1) have been set to "1". Also indicated, the request counters RC(9,0) and RC(9,9) have been incremented upon arrival of the cells at their VOQs, and decremented upon assignment to the subschedulers.

Still referring to FIG. 7a, in time slot t=1 a new cell arrives in input 0. The cell is to leave the switch on output port 0. Accordingly, it will be stored in VOQ(0,0). FIG. 7a shows the cell stored in VOQ(0,0). The main scheduler will become informed of this and will increment the request counter RC(0,0) corresponding to VOQ(0,0), (C(0,0)=C(0,0)+1). (Recall, e.g., FIG. 4A.)

Referring to FIG. 7b, at the beginning of time slot t=2, when k=2 (=2 mod 3), the scheduling control module will read RC(0,0) and see that C(0,0) is equal to one, and it will read RF(0,0,2) and see that F(0,0,2) is equal to zero. (Recall, e.g., 470 of FIG. 4b.) Dashed lines represent these actions. RC(0,0) will be decremented, C(0,0)=C(0,0)−1, and RF(0,0,2) will be set to one. (Recall, e.g., 474 and 472 of FIG. 4b.) Solid lines represent these actions. Within this cell time slot, subscheduler 2 begins to operate the maximal-sized matching according to the adopted algorithm. (Recall, e.g., 510, 520 and 530 of FIG. 5.) This is because 2≧2 (2≧Kl+k=3 (0)+2) and 2<5 (2<K(l+1)+k=3(1)+2). Subscheduler 2 will have completed its matching operation by the end of the fifth time slot (t=5).

Referring to FIG. 7c, at the end of time slot t=3, when k=1 (=(3−(3−1)) mod 3), the k=1 subscheduler will have completed its matching operation. Recall that earlier cell arrived in input port 9, at time slot t=0, and is to leave on output port 9. If the input-output pair (9,9) is matched, the flag RF(9,9,1) will be unset (i.e., F(9,9,1)=0), and the VOQ(9,9) will be informed that it won arbitration and that it can send its head of line (HOL) cell to output 0 (e.g., in the next time slot). (Recall, e.g., 550, 560, and 570 of FIG. 5.) Similarly, as indicated by FIG. 8, at the end of cell time slot t=4, subscheduler 2 will finish matching, and at the end of cell time slot t=5, subscheduler 0 will finish matching. If new cells continue to arrive, this pattern will continue and the main scheduler will be able to produce a match at the end of every cell time slot.

Therefore, as this example illustrates, the main scheduler was given more time to complete the matching by allowing three time slots instead of just one. In addition, the subschedulers may implement maximal matching algorithms that provide 100% throughput under uniform traffic, and maintains fairness for best-effort traffic.

§ 4.6 Conclusions

In view of the foregoing, the scheduling technique and apparatus of the present invention relax the time for scheduling, thereby enabling large scale and/or high throughput switching, while maintaining fairness for best-effort traffic. Other approaches, such as WRRGS, may fail for best-effort traffic. For example, if the allowable arbitration time per iteration, a port speed, a cell size, and the number of iterations are T, C, L, and I, respectively, then, T=(KL)/(CI), where K is the number of subschedulers. In the non-pipelined DRRM scheme, K will essentially be equal one. The foregoing equation shows that by adding subschedulers, the time for arbitration will increase. For example if the time for arbitration for a non-pipelined DRRM scheme was 3.2 ns, that time can be increased to 9.6 ns by implementing three subschedulers. Having more time for arbitration may become important, because it is difficult to implement round-robin arbitration that supports large numbers of inputs in hardware using available CMOS technology, in which, for example, typical gate-delay time is about 100 ps. Refer to Texas Instruments, "GS40 0:15-micrometer CMOS, Standard Cell/Gate Array," http://www.ti.com/, version 0.2, May 2000. Incorporated herein by reference. Therefore, the present invention achieves the desired number iterations even when the number of inputs increases or the port speed increases.

To reiterate, the present invention can achieve 100% throughput under uniform traffic, and maintain fairness for best-effort traffic. The known maximal-sized matching algorithms that meet both of these conditions require that a match be made at the end of every time slot. This becomes difficult, if not impossible, with decreasing arbitration times. The present invention advantageously allows for longer arbitration times, while still producing a match at the end of every time slot.

Given these conditions the present invention may allow the increase of inputs and output ports, and/or may allow for the increase in port speeds. In view of the foregoing, the present invention can provide a scalable switch that has high throughput and maintains fairness for best-effort traffic. The present invention can avoid the problems of (i) the increasing arbitration time as switch size increases, and/or (ii) decreasing cell time slots as port speed increases, by permitting the matching algorithm to use more time.

What is claimed is:

1. For use with a switch having a first number of input ports, a second number of output ports, each of the input ports having the second number of virtual output queues, and a third number of subschedulers, each of the third number of subschedulers being able to arbitrate matching to each of the second number of output ports, a method for scheduling the dispatch of cells or packets stored in the virtual output queues, the method comprising:

a) for each of the virtual output queues, maintaining a first indicator for indicating whether the virtual output queue is storing a cell awaiting dispatch arbitration;

b) for each of the subschedulers, maintaining a second indicator F(i,j,k) for indicating whether the subscheduler is available or reserved; and c) for each of the subschedulers, performing a matching operation, if it has been reserved, to match a cell buffered at a virtual output queue with its corresponding output port, wherein each of the subschedulers requires more than one cell time slot to generate a match from its matching operation, and wherein the subschedulers can collectively generate a match result for each output port in each cell time slot.

2. The method of claim 1 wherein each of the subschedulers requires the third number of cell time slots to generate a match from its matching operation.

3. The method of claim 1 wherein each of the subschedulers require no more than the third number of cell time slots to generate a match results from its matching operation.

4. The method of claim 1 wherein fairness for best-effort traffic is maintained.

5. The method of claim 1 wherein the matching operation is a matching operation selected from a group of matching operations consisting of (A) Dual Round-Robin Matching, and (B) iterative-SLIP.

6. The method of claim 1 further comprising:

d) if a cell buffered at a virtual output queue has been successfully matched with its corresponding output port, informing the virtual output queue.

7. The method of claim 6 further comprising:

e) for each of the virtual output queues, if the virtual output queue has been informed that it has been successfully matched with its corresponding output port, then dispatching its head of line cell.

8. The method of claim 7 wherein the head of line cell is dispatched in a next cell time slot.

9. The method of claim 1 further comprising:

e) if a cell buffered at a virtual output queue has been successfully matched with its corresponding output port, then dispatching its head of line cell.

10. The method of claim 9 wherein the head of line cell is dispatched in a next cell time slot.

11. The method of claim 1 wherein the first indicator, for each of the virtual output queues, for indicating whether the virtual output queue is storing a cell awaiting dispatch, is a count, wherein the count is incremented upon learning that a new cell has arrived at the virtual output queue.

12. The method of claim 11 wherein the count is decremented when an available subscheduler is reserved for considering a head of line cell at a corresponding virtual output queue.

13. The method of claim 1 wherein the second indicator, for each of the subschedulers, is set to indicate that the associated subscheduler is reserved if the first indicator indicates that a corresponding virtual output queue is storing a cell awaiting dispatch arbitration.

14. The method of claim 1 wherein the second indicator, for each of the subschedulers, is set to indicate that the associated subscheduler is available if the associated subscheduler matches a cell buffered at a virtual output queue with its corresponding output port.

15. The method of claim 1 wherein the second indicator is set to indicate that a $k^{th}$ subscheduler is reserved if the first indicator indicates that a corresponding virtual output queue is storing a cell awaiting dispatch arbitration, wherein k is set to the current cell time slot modulo the third number.

16. For use with a switch including a first number of output ports, a second number of input ports, and the first number of virtual output queues associated with each of the second number of input ports, a dispatch scheduler comprising:

a) a third number of subschedulers;

b) a first indicator, associated with each of the virtual output queues, for indicating whether the virtual output queue is storing a cell awaiting dispatch arbitration; and c) a second indicator, for each of the subschedulers, indicating whether the subscheduler is available or reserved, wherein each of the subschedulers is adapted to perform a matching operation, if it has been reserved, to match a cell buffered at a virtual output queue with its corresponding output port, wherein each of the subschedulers requires more than one cell time slot to generate a match from its matching operation, and wherein the subschedulers can collectively generate a match result for each output port in each cell time slot.

17. The dispatch scheduler of claim 16 wherein each of the subschedulers requires the third number of cell time slots to generate a match from its matching operation.

18. The dispatch scheduler of claim 16 wherein each of the subschedulers require no more than the third number of cell time slots to generate a match results from its matching operation.

19. The dispatch scheduler of claim 16 wherein fairness for best-effort traffic is maintained.

20. The dispatch scheduler of claim 16 wherein the matching operation is a matching operation selected from a group of matching operations consisting of (A) Dual Round-Robin Matching, and (B) iterative-SLIP.

21. The dispatch scheduler of claim 16 wherein if a cell buffered at a virtual output queue has been successfully matched with its corresponding output port, the virtual output queue is so informed.

22. The dispatch scheduler of claim 16 wherein if a cell buffered at a virtual output queue has been successfully matched with its corresponding output port, its head of line cell is dispatched.

23. The dispatch scheduler of claim 22 wherein the head of line cell is dispatched in a next cell time slot.

24. The dispatch scheduler of claim 16 wherein the first indicator, for each of the virtual output queues, for indicating whether the virtual output queue is storing a cell awaiting dispatch arbitration, is a count, wherein the count is incremented upon learning that a new cell has arrived at the virtual output queue.

25. The dispatch scheduler of claim 24 wherein the count is decremented when an available subscheduler is reserved for considering a head of line cell at a corresponding virtual output queue.

26. The dispatch scheduler of claim 16 wherein the second indicator, for each of the subschedulers, is set to indicate that the associated subscheduler is reserved if the first indicator indicates that a corresponding virtual output queue is storing a cell awaiting dispatch arbitration.

27. The dispatch scheduler of claim 16 wherein the second indicator, for each of the subschedulers, is set to indicate that the associated subscheduler is available if the associated subscheduler matches a cell buffered at a virtual output queue with its corresponding output port.

28. The dispatch scheduler of claim 16 wherein the second indicator is set to indicate that a $k^{th}$ subscheduler is reserved if the first indicator indicates that a corresponding virtual output queue is storing a cell awaiting dispatch, wherein k is set to the current cell time slot modulo the third number.

29. For use with a switch having a first number of input ports, a second number of output ports, each of the input ports having the second number of virtual output queues, and a third number of subschedulers, each of the third number of subschedulers being able to arbitrate matching to each of the second number of output ports, a method for scheduling the dispatch of cells or packets stored in the virtual output queues, the method comprising for each of the subschedulers, performing a matching operation, if it has been reserved, to match a cell buffered at a virtual output queue with its corresponding output port, wherein each of the subschedulers requires more than one cell time slot to generate a match from its matching operation, wherein the subschedulers can collectively generate a match result for each output port in each cell time slot, and fairness is maintained for best-effort traffic.

30. The method of claim 29 wherein each of the subschedulers requires the third number of cell time slots to generate a match from its matching operation.

31. The method of claim 29 wherein each of the subschedulers require no more than the third number of cell time slots to generate a match results from its matching operation.

32. The method of claim 29 wherein the matching operation is a matching operation selected from a group of matching operations consisting of (A) Dual Round-Robin Matching, and (B) iterative-SLIP.

*33. A method for scheduling the dispatch of cells stored in an output queue of a switch, the method comprising:*

*maintaining a first indicator for indicating whether the output queue is storing a cell awaiting dispatch arbitration;*

*maintaining a second indicator for indicating whether a subscheduler is available or reserved; and*

*performing a matching operation to match a cell buffered at the output queue with a corresponding output port if, based on the first indicator the output queue is storing the cell awaiting dispatch arbitration and if, based on the second indicator, the subscheduler has been reserved,*

*wherein the subscheduler requires more than one cell time slot to generate a match from the matching operation, and wherein the subscheduler collectively generates a match result in each cell time slot for the output port.*

*34. The method of claim 33, wherein the subscheduler requires a number of cell time slots equal to a total number of subschedulers to generate the match from the matching operation.*

*35. The method of claim 33, wherein the subscheduler requires no more than a number of cell time slots equal to a total number of subschedulers to generate the match results from the matching operation.*

*36. The method of claim 33, wherein fairness for best-effort traffic is maintained.*

*37. The method of claim 33, wherein the matching operation comprises at least one of the following: a Dual Round-Robin Matching operation and an iterative-SLIP operation.*

*38. The method of claim 33, further comprising, if the cell buffered at the output queue has been successfully matched with the corresponding output port, informing the output queue.*

*39. The method of claim 38 further comprising, if the output queue has been informed that it has been successfully matched with the corresponding output port, dispatching a head of line cell.*

*40. The method of claim 39, wherein the head of line cell is dispatched in a next cell time slot.*

*41. The method of claim 33, further comprising, if the cell buffered at the output queue has been successfully matched with the corresponding output port, dispatching a head of line cell.*

*42. The method of claim 41, wherein the head of line cell is dispatched in a next cell time slot.*

*43. The method of claim 33, wherein the first indicator for indicating whether the output queue is storing a cell awaiting dispatch, is a count, and wherein the count is incremented upon learning that a new cell has arrived at the output queue.*

*44. The method of claim 43, wherein the count is decremented when the subscheduler is reserved for considering a head of line cell at the corresponding output queue.*

*45. The method of claim 33, wherein the second indicator is set to indicate that the subscheduler is reserved if the first indicator indicates that the corresponding output queue is storing a cell awaiting dispatch arbitration.*

*46. The method of claim 33, wherein the second indicator is set to indicate that the subscheduler is available if the associated subscheduler matches a cell buffered at the output queue with the corresponding output port.*

*47. The method of claim 33 further comprising a plurality of subschedulers that define an order, wherein each of the subschedulers have a respective position in the order, and wherein the second indicator is set to indicate the subscheduler at the respective position is reserved if the first indicator indicates that the corresponding output queue is storing a cell awaiting dispatch arbitration, wherein the respective position is set to the current cell time slot modulo a total number of the plurality of subschedulers.*

*48. A dispatch scheduler for use with a switch, the dispatch scheduler comprising:*

*a) a subscheduler;*

*b) a first indicator module having a first indicator, associated with an output queue, for indicating whether the output queue is storing a cell awaiting dispatch arbitration; and*

*c) a second indicator module having a second indicator for indicating whether the subscheduler is available or reserved,*

*wherein the subscheduler is configured to perform a matching operation to match a cell buffered at the output queue with a corresponding output port if, based on the first indicator the output queue is storing the cell awaiting dispatch arbitration and if, based on the second indicator, the subscheduler has been reserved, wherein the subscheduler requires more than one cell time slot to generate a match from the matching operation, and wherein the subscheduler collectively generates a match result in each cell time slot for the output port.*

*49. The dispatch scheduler of claim 48, wherein the subscheduler requires a number of cell time slots equal to a total number of subschedulers to generate the match from the matching operation.*

*50. The dispatch scheduler of claim 48, wherein the subscheduler requires no more than a number of cell time slots equal to a total number of subschedulers to generate the match results from the matching operation.*

*51. The dispatch scheduler of claim 48, wherein fairness for best-effort traffic is maintained.*

*52. The dispatch scheduler of claim 48, wherein the matching operation comprises at least one of the following: a Dual Round-Robin Matching operation and an iterative-SLIP operation.*

*53. The dispatch scheduler of claim 48, wherein if a cell buffered at the output queue has been successfully matched with the corresponding output port, the output queue is so informed.*

*54. The dispatch scheduler of claim 48, wherein if a cell buffered at the output queue has been successfully matched with the corresponding output port, a head of line cell is dispatched.*

*55. The dispatch scheduler of claim 54, wherein the head of line cell is dispatched in a next cell time slot.*

*56. The dispatch scheduler of claim 48, wherein the first indicator is a count, and wherein the count is incremented upon learning that a new cell has arrived at the output queue.*

*57. The dispatch scheduler of claim 56, wherein the count is decremented when the subscheduler is reserved for considering a head of line cell at the corresponding output queue.*

*58. The dispatch scheduler of claim 48, wherein the second indicator is set to indicate that the subscheduler is reserved if the first indicator indicates that the corresponding output queue is storing a cell awaiting dispatch arbitration.*

*59. The dispatch scheduler of claim 48, wherein the second indicator is set to indicate that the subscheduler is available if the subscheduler matches a cell buffered at the output queue with the corresponding output port.*

*60. The dispatch scheduler of claim 48 further comprising a plurality of subschedulers that define an order, wherein each of the subschedulers have a respective position in the order, and wherein the second indicator is set to indicate the subscheduler at the respective position is reserved if the first indicator indicates that the corresponding output queue is storing a cell awaiting dispatch arbitration, wherein the respective position is set to the current cell time slot modulo a total number of the plurality of subschedulers.*

* * * * *

UNITED STATES PATENT AND TRADEMARK OFFICE

CERTIFICATE OF CORRECTION

PATENT NO. : RE43,110 E
APPLICATION NO. : 12/072900
DATED : January 17, 2012
INVENTOR(S) : Oki et al.

It is certified that error appears in the above-identified patent and that said Letters Patent is hereby corrected as shown below:

Page 2, item (56), under "Other Publications", in Column 1, Line 25, delete "Guarentees" and insert -- Guarantees --.

Page 2, item (56), under "Other Publications", in Column 2, Line 8, delete "Muppals" and insert -- Muppala --.

Signed and Sealed this
Nineteenth Day of June, 2012

David J. Kappos

David J. Kappos
*Director of the United States Patent and Trademark Office*